US012768209B2

(12) United States Patent
Choi et al.

(10) Patent No.: US 12,768,209 B2
(45) Date of Patent: Oct. 20, 2026

(54) TWO-STEP HINGE ASSEMBLY FOR A DOOR COVER

(71) Applicant: GM Global Technology Operations LLC, Detroit, MI (US)

(72) Inventors: Kangsun Choi, Anyang-si (KR); Junghoon Kim, Seoul (KR); Jongseok Yoon, Seoul (KR); Yongho Cho, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 301 days.

(21) Appl. No.: 18/633,869

(22) Filed: Apr. 12, 2024

(65) Prior Publication Data

US 2025/0320759 A1 Oct. 16, 2025

(51) Int. Cl.
*E05D 3/12* (2006.01)
*E05F 1/12* (2006.01)

(52) U.S. Cl.
CPC ............ *E05D 3/125* (2013.01); *E05F 1/1207* (2013.01); *E05Y 2600/14* (2013.01); *E05Y 2600/622* (2013.01); *E05Y 2900/534* (2013.01)

(58) Field of Classification Search
CPC ........... E05D 11/1007; E05D 2005/067; E05D 3/125; E05F 1/1207
USPC ........................................................ 296/97.22
See application file for complete search history.

(56) References Cited

U.S. PATENT DOCUMENTS

| | | | | |
|---|---|---|---|---|
| 4,928,350 A | | 5/1990 | Morgan | |
| 5,561,887 A | | 10/1996 | Neag et al. | |
| 5,685,046 A | | 11/1997 | Neag et al. | |
| 11,634,025 B2 | * | 4/2023 | Rudolf | B60K 15/05 49/339 |
| 2016/0107521 A1 | * | 4/2016 | Jones | B60K 15/05 296/97.22 |
| 2020/0055389 A1 | * | 2/2020 | Herzig | E05D 3/125 |

OTHER PUBLICATIONS

Kim, J., et al. U.S. Appl. No. 18/532,192, filed Dec. 7, 2023.
United States Patent and Trademark Office. U.S. Appl. No. 18/532,192, filed Dec. 7, 2023.

* cited by examiner

*Primary Examiner* — Caroline N Butcher
(74) *Attorney, Agent, or Firm* — Vivacqua Crane, PLLC

(57) ABSTRACT

A two-step hinge assembly for a door cover that provides access to an opening defined by a body panel includes a hinge inlet attached to the door cover, a hinge neck rotatably mounted to the body panel about a main axis of rotation, a retaining member actuated between an engaged position and a disengaged position, and a biasing member. The biasing member exerts a biasing force upon the retaining member to maintain the retaining member in the engaged position, where the retaining member is urged from the engaged position into the disengaged position when an actuation force that opposes the biasing force is exerted upon the retaining member. The retaining member disengages with a mating feature of the hinge inlet when urged into the disengaged position to allow the hinge inlet to rotate independently about a local axis of rotation.

20 Claims, 5 Drawing Sheets

TWO-STEP HINGE ASSEMBLY FOR A DOOR COVER

INTRODUCTION

The present disclosure relates to a two-step hinge assembly for a door cover that provides access to an opening defined a body panel.

An electric vehicle is powered by one or more electric motors that draw electricity from a battery pack. The battery pack is charged by an external power supply. The electric vehicle also includes a charge port that allows for the electric vehicle to connect to the external power supply to charge the battery. The electric vehicle also includes charge port door that rotates between a closed and an opened position, where the charge port door protects the charge port from external elements when in the closed position and provides access to the charge port in the opened position.

An individual may charge the electric vehicle at a charging station by opening the charge port door to access the electric vehicle's charge port. When opened, the charge port door is usually positioned perpendicular with respect to the vehicle. It is to be appreciated that sometimes space may be limited at charging stations. For example, public charging stations, which are found in places such as retail shopping centers and parking lots, often have limited space between two parked electric vehicles. As a result, when an individual opens the charge port door, there may be a lack of clearance if the individual's vehicle is parked directly adjacent to another vehicle. One solution is to provide a larger hinge that allows for further rotation of the charge port door. However, a larger hinge results in a larger charge port door, which may adversely affect the overall aesthetics of the electric vehicle.

Thus, while charge port doors achieve their intended purpose, there is a need in the art for an improved approach for increasing the range of rotation of a charge port door for an electric vehicle.

SUMMARY

According to several aspects, a two-step hinge assembly for a door cover that provides access to an opening defined by a body panel is disclosed. The two-step hinge assembly includes a hinge inlet attached to the door cover, the hinge inlet defining a mating feature, where the hinge inlet independently rotates about a local axis of rotation of the two-step hinge assembly between a first step opened position and a second step opened position. The two-step hinge assembly includes a hinge neck rotatably mounted to the body panel about a main axis of rotation, where hinge inlet and the hinge neck rotate together about the main axis of rotation when the two-step hinge assembly is in the first step opened position and a closed position. The two-step hinge assembly includes a retaining member actuated between an engaged position and a disengaged position, where the retaining member engages with the mating feature of the hinge inlet when in the engaged position to secure the hinge inlet with the hinge neck, and where the two-step hinge assembly is in the closed position and the first step opened position when the retaining member is in the engaged position. The two-step hinge assembly includes a biasing member exerting a biasing force upon the retaining member to maintain the retaining member in the engaged position, where the retaining member is urged from the engaged position into the disengaged position when an actuation force that opposes the biasing force is exerted upon the retaining member. The retaining member disengages with the mating feature of the hinge inlet when urged into the disengaged position to allow the hinge inlet to rotate independently about the local axis of rotation.

In an aspect, an angle measured between an inner surface of the door cover and the body panel increases as the hinge inlet rotates about the local axis of rotation from the first step opened position into the second step opened position.

In another aspect, the hinge inlet includes an inlet opening that receives an engagement arm of the retaining member when the two-step hinge assembly is in the closed position and the first step opened position and the retaining member is in the engaged position.

In yet another aspect, the inlet opening of the hinge inlet defines an inner surface and the mating feature, and the mating feature is disposed along the inner surface of the inlet opening.

In an aspect, the engagement arm of the retaining member includes a proximate end and a distal end, and the distal end of the engagement arm includes a hook that defines a connection surface corresponding to the mating feature of the hinge inlet.

In another aspect, the connection surface of the hook of the engagement arm of the retaining member abuts against a mating surface defined by the mating feature disposed along the inner surface of the inlet opening of the hinge inlet.

In yet another aspect, the hinge neck defines a cavity shaped to receive a portion of the retaining member and the biasing member.

In an aspect, the cavity includes a button opening disposed along an outer neck surface of the hinge neck, and where the outer neck surface of the hinge inlet is visible when the two-step hinge assembly is in the first step opened position.

In another aspect, the retaining member includes a button, and wherein the button opening of the of the hinge neck receives the button of the retaining member.

In yet another aspect, the cavity defines a passageway that terminates at a first stopper surface.

In an aspect, the retaining member includes a biasing arm that defines a first contact surface, and the retaining member continues to move within the cavity in the same direction as the actuation force until the first contact surface of the biasing arm of the retaining member abuts against the first stopper surface of the passageway of the cavity.

In another aspect, the two-step hinge assembly includes a torsion biasing member located along the local axis of rotation, where the torsion biasing member exerts a rotational force upon the hinge inlet to rotate the hinge inlet from the first step opened position into the second step opened position.

In yet another aspect, the hinge inlet includes one or more hinge knuckles that receive a pin disposed along the local axis of rotation.

In an aspect, the hinge inlet includes one or more stopper members that are each positioned to simultaneously abut against an outer surface of the hinge neck as the two-step hinge assembly rotates from the first step opened position into the second step opened position.

In another aspect, the biasing member is one of the following: a coil spring, a ring constructed of an elastically deformable material, and a pad constructed of an elastically deformable material.

In yet another aspect, the door cover is positioned perpendicular with respect to the body panel when the two-step hinge assembly is in the first step opened position and is positioned parallel with respect to the body panel when the two-step hinge assembly is in the second step opened position.

In an aspect, a door assembly is disclosed and includes a body panel defining an opening, a door cover that provides access to the opening defined by the body panel, and a two-step hinge assembly that rotatably mounts the door cover to the body panel. The two-step hinge assembly includes a hinge inlet attached to the door cover, the hinge inlet defining a mating feature, where the hinge inlet independently rotates about a local axis of rotation of the two-step hinge assembly between a first step opened position and a second step opened position. The two-step hinge assembly includes a hinge neck rotatably mounted to the body panel about a main axis of rotation, where the hinge inlet and the hinge neck rotate together about the main axis of rotation when the two-step hinge assembly is in the first step opened position and a closed position. The two-step hinge assembly includes a retaining member actuated between an engaged position and a disengaged position, where the retaining member engages with the mating feature of the hinge inlet when in the engaged position to secure the hinge inlet with the hinge neck, and wherein the two-step hinge assembly is in the closed position and the first step opened position when the retaining member is in the engaged position. The two-step hinge assembly includes a biasing member exerting a biasing force upon the retaining member to maintain the retaining member in the engaged position, where the retaining member is urged from the engaged position into the disengaged position when an actuation force that opposes the biasing force is exerted upon the retaining member, and the retaining member disengages with the mating feature of the hinge inlet when urged into the disengaged position to allow the hinge inlet to rotate independently about the local axis of rotation.

In another aspect, an angle measured between an inner surface of the door cover and the body panel increases as the hinge inlet rotates about the local axis of rotation from the first step opened position into the second step opened position.

In yet another aspect, the hinge inlet includes an inlet opening that receives an engagement arm of the retaining member when the two-step hinge assembly is in the closed position and the first step opened position and the retaining member is in the engaged position.

In an aspect, a door assembly for a vehicle is disclosed, and includes a body panel defining an opening, a door cover that provides access to the opening defined by the body panel, and a two-step hinge assembly that rotatably mounts the door cover to the body panel. The two-step hinge assembly includes a hinge inlet attached to the door cover, where the hinge inlet defining a mating feature and an inlet opening, and where the hinge inlet independently rotates about a local axis of rotation of the two-step hinge assembly between a first step opened position and a second step opened position. The two-step hinge assembly includes a hinge neck rotatably mounted to the body panel about a main axis of rotation, where the hinge inlet and the hinge neck rotate together about the main axis of rotation when the two-step hinge assembly is in the first step opened position and a closed position. The two-step hinge assembly includes a retaining member actuated between an engaged position and a disengaged position and including an engagement arm, where the engagement arm of the retaining member is received by the inlet opening of the hinge inlet and engages with the mating feature of the hinge inlet when in the engaged position to secure the hinge inlet with the hinge neck, and wherein the two-step hinge assembly is in the closed position and the first step opened position when the retaining member is in the engaged position. The two-step hinge assembly includes a biasing member exerting a biasing force upon the retaining member to maintain the retaining member in the engaged position. The retaining member is urged from the engaged position into the disengaged position when an actuation force that opposes the biasing force is exerted upon the retaining member, and the retaining member disengages with the mating feature of the hinge inlet when urged into the disengaged position to allow the hinge inlet to rotate independently about the local axis of rotation. An angle measured between an inner surface of the door cover and the body panel increases as the hinge inlet rotates about the local axis of rotation from the first step opened position into the second step opened position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
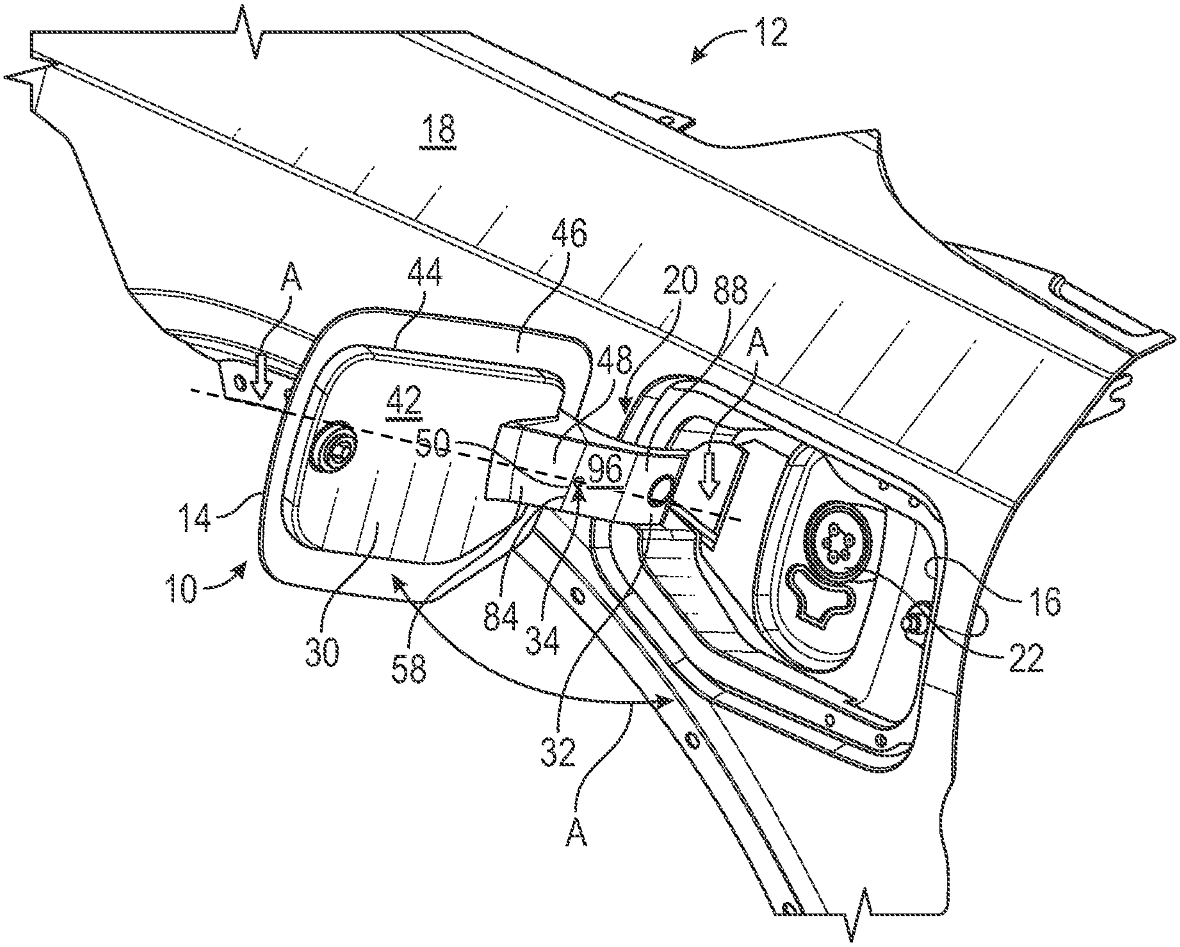
FIG. 1 is a perspective view of one embodiment of a door cover that provides access to a charge port of an electric vehicle and the disclosed two-step hinge assembly, where the two-step hinge assembly is in a first step opened position, according to an exemplary embodiment.

Referring to FIG. 1, a perspective view of an exemplary door assembly 10 for an electric vehicle 12 is shown. The door assembly 10 includes a door cover 14 that provides access to an opening 16 defined by a body panel 18 of the electric vehicle 12. In the non-limiting embodiment as shown in the figures, the opening 16 defined by the body panel 18 provides access to a charge port 22 of the electric vehicle 12. The door assembly 10 also includes a two-step hinge assembly 20 that rotatably mounts the door cover 14 to the body panel 18 of the electric vehicle 12. The two-step hinge assembly 20 includes a hinge inlet 30, a hinge neck 32, and a retaining member 34 (the retaining member 34 is fully visible in FIG. 2).

Figure 2:
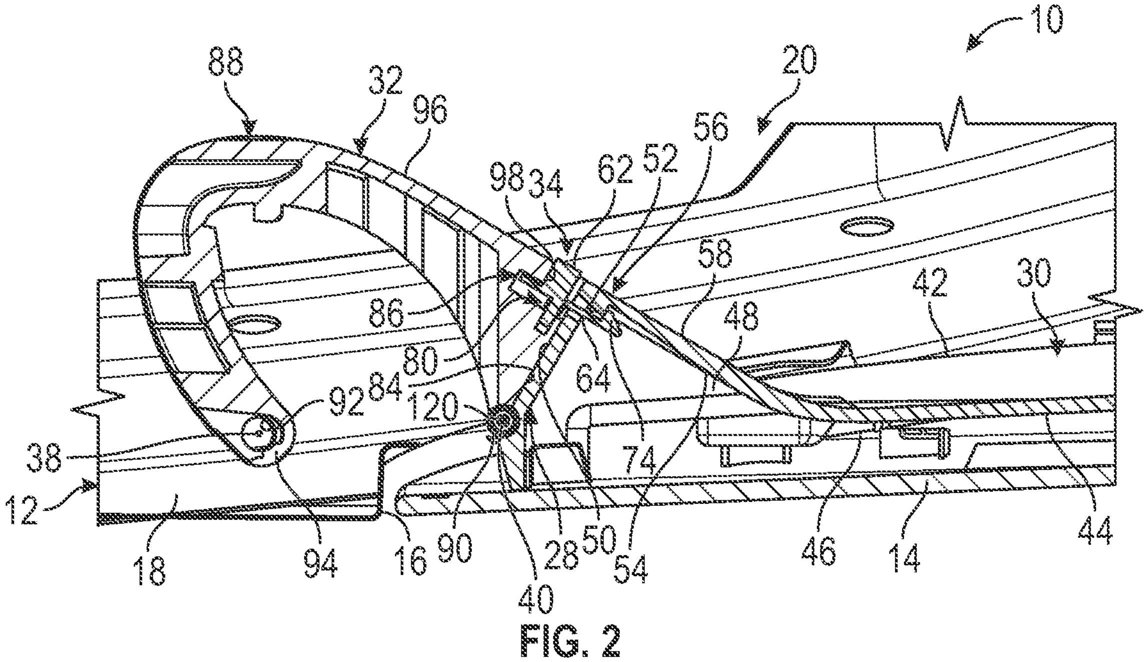
FIG. 2 is a top view of the two-step hinge assembly taken at section A-A in FIG. 1, where the two-step hinge assembly is in a closed position where the door cover is flush with a body panel of the electric vehicle, according to an exemplary embodiment.
Figure 3:
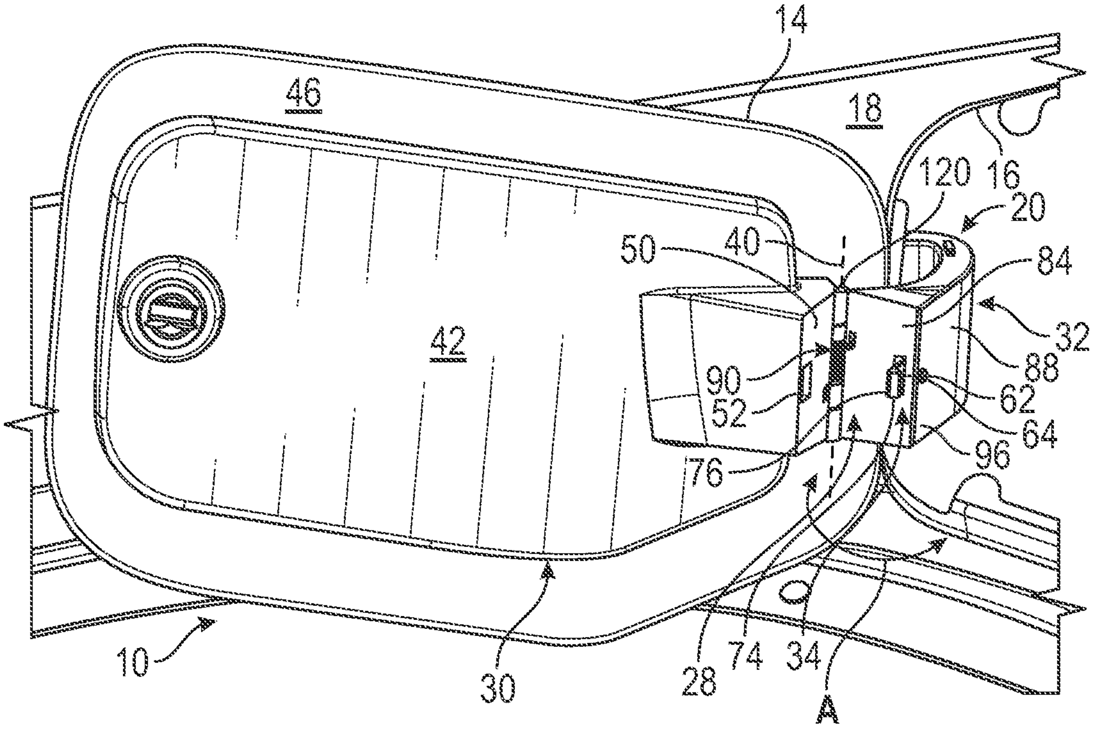
FIG. 3 illustrates the two-step hinge assembly in a second step opened position where the door panel is positioned parallel with respect to the body panel of the electric vehicle, according to an exemplary embodiment.

FIG. 1 illustrates the two-step hinge assembly 20 in a first step opened position. When in the first step opened position, the door cover 14 is positioned perpendicular with respect to the body panel 18 defining the opening 16. That is, an angle A measured between an inner surface 46 of the door cover 14 and the body panel 18 of the electric vehicle 12 is about ninety degrees when the two-step hinge assembly 20 in a first step opened position. FIG. 2 illustrates the two-step hinge assembly 20 in a closed position where the door cover 14 is flush with respect to the body panel 18 of the electric vehicle 12. FIG. 3 illustrates the two-step hinge assembly 20 in a second step opened position. When in the second step opened position, the door cover 14 is positioned parallel with respect to the body panel 18 defining the opening 16. That is, the angle A measured between the inner surface 46 of the door cover 14 and the body panel 18 of the electric vehicle 12 is about one-hundred and eighty degrees when the two-step hinge assembly 20 in the second step opened position.

FIG. 3 illustrates the door cover 14 positioned parallel with respect to the body panel 18 when the two-step hinge assembly 20 is in the second step opened position. However, it is to be appreciated that the hinge inlet 30 separates from the hinge neck 32 in the second step opened position, which in turn increases the angle A measured between the inner surface 46 of the door cover 14 and the body panel 18 when compared to the first step opened position, and the door cover 14 is not limited to the being positioned parallel with respect to the body panel 18 when in the second step opened position. Increasing the angle A measured between the inner surface 46 of the door cover 14 and the body panel 18 between the first step opened position and the second step opened position results in less space required between the electric vehicle 12 and an adjacent vehicle. Requiring less space between vehicles may be especially helpful when an individual opens the door cover 14 to access the charge port 22 when there is a lack of clearance between the electric vehicle 12 and another vehicle parked directly adjacent to the electric vehicle 12 during charging. Furthermore, although the figures illustrate the two-step hinge assembly 20 as part of an electric vehicle 12, it is to be appreciated that the two-step hinge assembly 20 may be used in other applications as well. For example, the two-step hinge assembly 20 may be used in other types of access doors such as, for example, a fuel access door for a vehicle.

Referring generally to FIGS. 1-3, both the hinge inlet 30 and the hinge neck 32 of the two-step hinge assembly 20 rotate together about a main axis of rotation 38 (shown in FIG. 2) between the closed position and the first step opened position. The main axis of rotation 38 is positioned behind the body panel 18 of the electric vehicle 12, where the hinge neck 32 is rotatably mounted to the body panel 18 about the main axis of rotation 38. As explained below, the retaining member 34 secures the hinge inlet 30 to the hinge neck 32 when the two-step hinge assembly 20 is in the closed and first step opened position. The retaining member 34 is actuated by a user to disengage the retaining member 34 from a mating feature 56 that is part the hinge inlet 30 (seen in FIG. 2), and the hinge inlet 30 is free to independently rotate about a local axis of rotation 40 (FIGS. 2 and 3) relative to the hinge neck 32 of the two-step hinge assembly 20 between the first step position and the second step position. The local axis of rotation 40 is positioned at an interface 28 between the hinge inlet 30 and the hinge neck 32, and the main axis of rotation 38 and the local axis of rotation 40 are oriented parallel with respect to one another.

Referring to FIGS. 1 and 2, the hinge inlet 30 of the two-step hinge assembly 20 defines an inner planar surface 42 and an outer planar surface 44, where the outer planar surface 44 is attached to the inner surface 46 the door cover 14 of the door assembly 10. Referring specifically to FIG. 2, the hinge inlet 30 includes an inlet abutment plate 48 that extends from the inner planar surface 42, an inlet abutment surface 50 and an inlet opening 52 that defines an inner surface 54. The hinge inlet 30 also includes the mating feature 56 disposed along the inner surface 54 of the inlet opening 52 and an outer hinge surface 58.

Referring to FIGS. 2 and 3, the inlet abutment surface 50 defined by the inlet abutment plate 48 of the hinge inlet 30 abuts against and contacts a neck abutment surface 84 defined by the hinge neck 32 when the two-step hinge assembly 20 is the first step opened position (FIG. 1) and the closed position (FIG. 2). The inlet opening 52 of the hinge inlet 30 receives an engagement arm 64 of the retaining member 34 when the two-step hinge assembly 20 is in the closed position and the first step opened position. As seen in FIG. 3, the engagement arm 64 of the retaining member 34 is no longer received by the inlet opening of the hinge inlet 30 when the two-step hinge assembly 20 is in the second step opened position. As explained below, the mating feature 56 disposed along the inner surface 54 of the inlet opening 52 of the hinge inlet 30 (FIG. 2) is shaped to engage with a distal end 74 of the engagement arm 64 of the retaining member 34 when the two-step hinge assembly 20 is the first step opened position and the closed position.

The retaining member 34 is actuated between an engaged position (shown in FIG. 2) and a disengaged position (shown in FIG. 3), where the retaining member 34 engages with the mating feature 56 of the hinge inlet 30 when in the engaged position to secure the hinge inlet 30 with the hinge neck 32. The two-step hinge assembly 20 is in the closed position and the first step opened position when the retaining member 34 is in the engaged position. As explained below, when the retaining member 34 is actuated by a user, the retaining member 34 disengages with the mating feature 56 disposed along the inner surface 54 of the inlet opening 52 of the hinge inlet 30, and a torsion biasing member 90 located along the local axis of rotation 40 exerts a rotational force upon the hinge inlet 30 to rotate the hinge inlet 30 into the second step opened position.

As the hinge inlet 30 rotates about the local axis of rotation 40 from the first step opened position into the second step opened position, the inlet abutment surface 50 of the hinge inlet 30 separates from the neck abutment surface 84 defined by the hinge neck 32. That is, the inlet abutment surface 50 of the hinge inlet 30 ceases to contact the neck abutment surface 84 defined by the hinge neck 32 as the hinge inlet 30 rotates about the local axis of rotation 38. Allowing the hinge inlet 30 to separate from the hinge neck 32 increases the angle A measured between the door cover 14 and the body panel 18.

Figure 4:
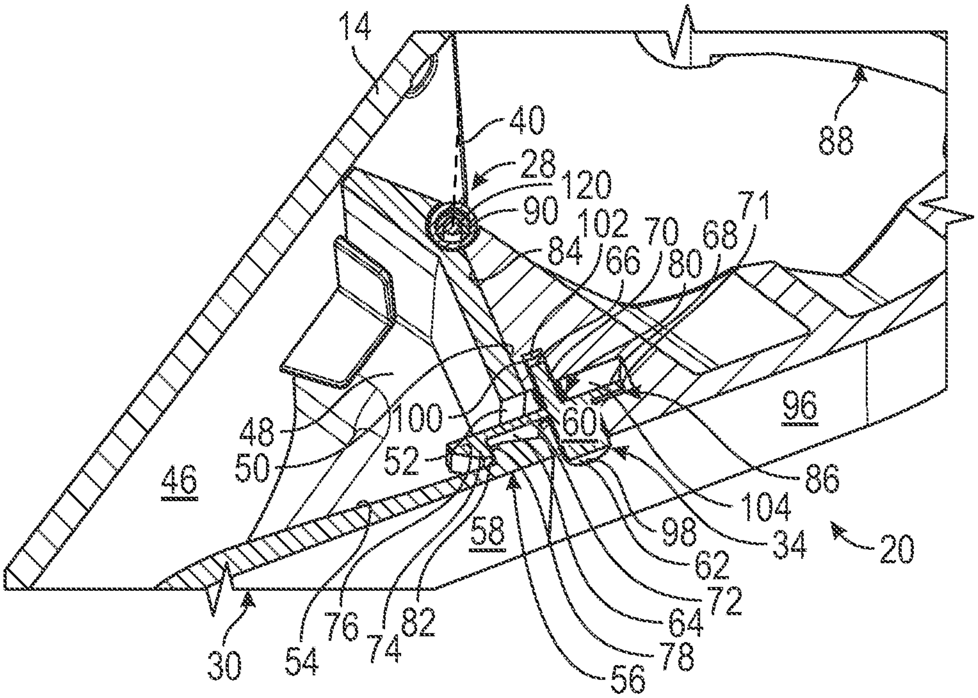
FIG. 4 is an enlarged view of the door cover and the two-step hinge assembly taken at Section A-A in FIG. 1, according to an exemplary embodiment.

FIG. 4 is an enlarged perspective view of the door cover 14, the hinge inlet 30, the hinge neck 32, and the retaining member 34 taken along Section A-A in FIG. 1. The retaining member 34 includes a main body 60, where the main body 60 of the retaining member 34 defines a button 62, the engagement arm 64, a first contact surface 66, a second contact surface 68, a biasing arm 70 that defines the first contact surface 66, and a stopper arm 71 that defines the second contact surface 68. The engagement arm 64 includes a proximate end 72 and the distal end 74, where the proximate end 72 of the engagement arm 64 is connected to the main body 60 of the retaining member 34. The distal end 74 of the engagement arm 64 includes a hook 76 that defines a connection surface 78 that corresponds to the mating feature 56 of the hinge inlet 30.

The two-step hinge assembly 20 also includes a biasing member 80 engaged with both the hinge neck 32 and the retaining member 34. The connection surface 78 of the hook 76 disposed at the distal end 74 of the engagement arm 64 of the retaining member 34 abuts against a mating surface 82 defined by the mating feature 56 disposed along the inner surface 54 of the inlet opening 52 of the hinge inlet 30. The engagement between the mating surface 82 of the mating feature 56 of the retaining member 34 and the mating surface 82 of the hinge inlet 30 secures the hinge inlet 30 and the hinge neck 32 to one another.

Referring to FIGS. 1, 2, and 4, the hinge neck 32 defines the neck abutment surface 84, a cavity 86 shaped to receive a portion of the retaining member 34 and the biasing member 80, a neck portion 88, an opening 92 positioned at a distal end 94 of the neck portion 88 (FIG. 2), an outer neck surface 96, and a button opening 98 positioned along the outer neck surface 96. The neck abutment surface 84 defined by the hinge neck 32 abuts against and contacts the inlet abutment surface 50 defined by the inlet abutment plate 48 of the hinge inlet 30 when the two-step hinge assembly 20 is the first step opened position (FIG. 1) and the closed position (FIG. 2). Referring specifically to FIGS. 1 and 3, the neck portion 88 represents an elongated curved section of the hinge neck 32 that wraps around the opening 16 defined by the body panel 18 of the electric vehicle 12 when the two-step hinge assembly 20 is in either the first step opened position or the second step opened position. Referring to FIG. 2, the opening 92 positioned at the distal end 94 of the neck portion 88 of the hinge neck 32 coincides with the main axis of rotation 38 of the two-step hinge assembly 20. The opening 92 of the hinge neck 32 is shaped to receive a pin (not shown) disposed along the main axis of rotation 38.

Figure 5:
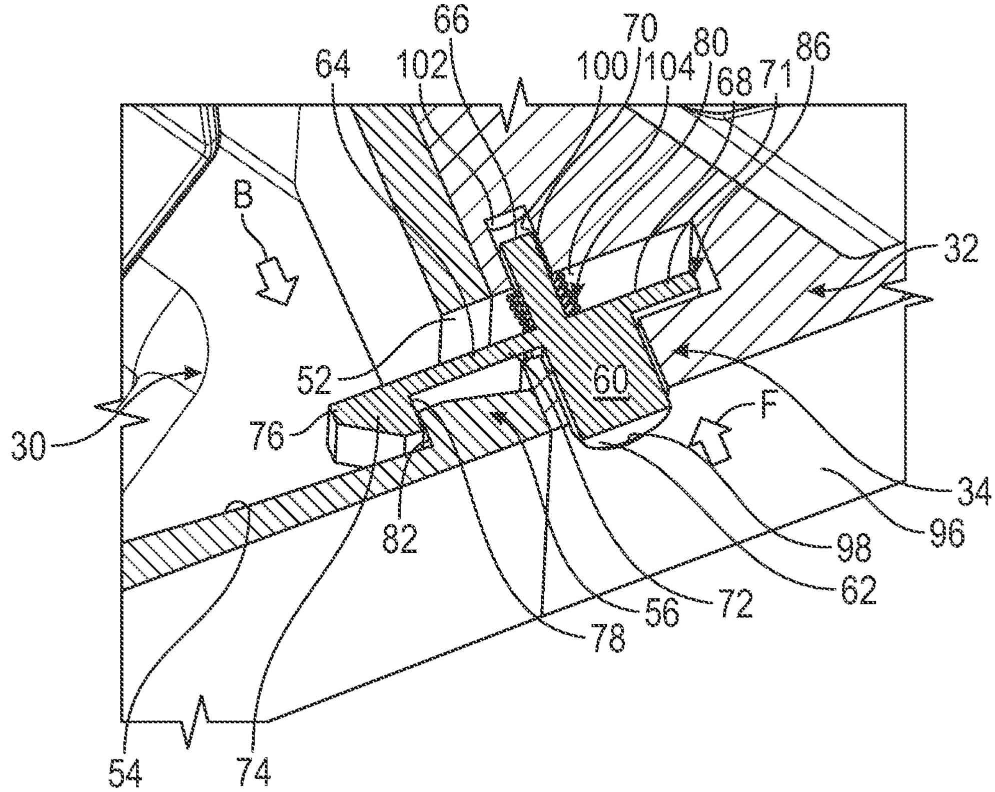
FIG. 5 is an enlarged view of a mating feature of the hinge inlet, a cavity defined by the hinge neck, the retaining member, and a biasing member shown in FIG. 4, according to an exemplary embodiment.

FIG. 5 is an enlarged view of the mating feature 56 of the hinge inlet 30, the cavity 86 defined by the hinge neck 32, the retaining member 34, and the biasing member 80. As seen in FIG. 5, the cavity 86 defined by the hinge neck 32 includes a passageway 100 shaped to receive the biasing arm 70 of the retaining member 34, where the passageway 100 terminates at a first stopper surface 102. The cavity 86 defined by the hinge neck 32 also includes a second stopper surface 104. The biasing member 80 is located between the second stopper surface 104 of the cavity 86 defined by the hinge neck 32 and the second contact surface 68 of the stopper arm 71 of the retaining member 34. When the retaining member 34 is in the engaged position as shown in FIG. 5, the biasing member 80 exerts a biasing force B oriented in a direction towards the button 62 of the retaining member 34 and the outer neck surface 96 of the hinge neck 32. The biasing force B exerted upon the retaining member 34 and maintains the retaining member 34 in the engaged position until a user actuates the retaining member 34 by pressing the button 62, which is explained below.

In the non-limiting embodiment as shown in the figures, the biasing member 80 is a coil spring that is wrapped around the biasing arm 70 of the retaining member 34. Although the figures illustrate the biasing member 80 as a coil spring, it is to be appreciated that the figures are merely exemplary in nature and the biasing member 80 may be any other type of biasing member that exerts the biasing force B upon the retaining member 34. For example, in another embodiment, the biasing member 80 may be a ring or a pad constructed of an elastically deformable material such as rubber. If the biasing member 80 is a ring, then the ring may surround the biasing arm 70 of the retaining member 34.

The button opening 98 is part of the cavity 86 defined by the hinge neck 32 and is disposed along the outer neck surface 96 of the hinge neck 32. The button opening 98 of the hinge neck 32 is shaped to receive the button 62 of the retaining member 34. It is to be appreciated that the outer neck surface 96 of the hinge neck 32 and the button 62 of the retaining member 34 are both visible to a user when the two-step hinge assembly 20 is in the first step opened position. Thus, when a user decides to rotate the two-step hinge assembly 20 into the second step opened position, the user may press the button 62 of the retaining member 34. When the user presses the button 62 of the retaining member 34, an actuation force F is exerted upon the button 62 to allow for the two-step hinge assembly 20 to rotate into the second step opened position (shown in FIG. 3). The actuation force F opposes the biasing force B exerted upon the retaining member 34 by the biasing member 80. Specifically, the actuation force F exerted upon the retaining member 34 overcomes the biasing force B exerted by the biasing member 80 and actuates the retaining member 34 from the engaged position into the disengaged position (shown in FIG. 3).

Referring to both FIGS. 3 and 5, the retaining member 34 is urged from the engaged position into the disengaged position when the actuation force F that opposes the biasing force B is exerted upon the button 62 of the retaining member 34. The retaining member 34 disengages with the mating feature 56 of the hinge inlet 30 when urged into the disengaged position to allow the hinge inlet 30 to rotate independently about the local axis of rotation 40. Specifically, when the retaining member 34 is in the disengaged position, the hook 76 disposed at the distal end 74 of the engagement arm 64 of the retaining member 34 disengages with the mating feature 56 of the hinge inlet 30 (shown in FIG. 3), thereby allowing the hinge inlet 30 to rotate independently about the local axis of rotation 40 and into the second step opened position.

Once the actuation force F is no longer exerted upon the retaining member 34 by the user, the biasing member 80 located within the cavity 86 of the hinge neck 32 urges the retaining member 34 back into the engaged position. However, as seen in FIG. 3, the hook disposed at the distal end 74 of the engagement arm 64 is free, and no longer engages with the mating feature 56 of the hinge inlet 30 (FIG. 5). Once the user wishes to close the door cover 14, the user may rotate the door cover 14 and the hinge inlet 30 about the local axis of rotation 40 back into the first opened position by allowing the inlet opening 52 of the hinge inlet 30 to receive the engagement arm 64 of the retaining member 34.

Referring to FIG. 5, it is to be appreciated that movement of the retaining member 34 within the cavity 86 defined by the hinge neck 32 in the same direction as the actuation force F is limited by the first stopper surface 102 of the passageway 100 of the cavity 86 and the second stopper surface 104 of the cavity 86. Specifically, as a user exerts the actuation force F upon the button 62 of the retaining member 34, the retaining member 34 continues to move within the cavity 86 defined by the hinge neck 32 in the same direction as the actuation force F until the first contact surface 66 of the biasing arm 70 of the retaining member 34 abuts against the first stopper surface 102 of the passageway 100 of the cavity 86 and the second contact surface 68 of the stopper arm 71 of the retaining member 34 abuts against the second stopper surface 104 of the cavity 86 of the hinge neck 32.

Figure 6:
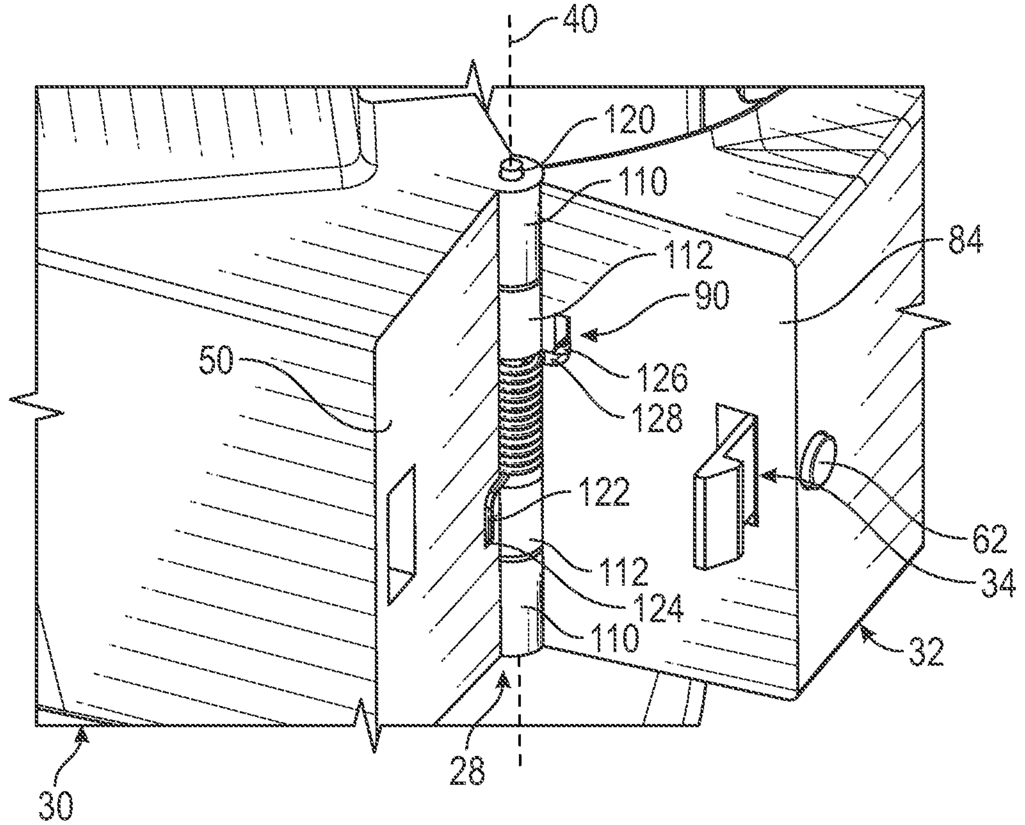
FIG. 6 is an enlarged view of an interface between the hinge inlet and the hinge neck of the two-step hinge assembly, according to an exemplary embodiment.

FIG. 6 is an enlarged view of the interface 28 between the hinge inlet 30 and the hinge neck 32 of the two-step hinge assembly 20. As mentioned above, the torsion biasing member 90 is located along the local axis of rotation 40 and exerts a rotational force upon the hinge inlet 30 to rotate the hinge inlet 30 from the first step opened position into the second step opened position. Specifically, once the retaining member 34 is urged into the disengaged position, the torsion biasing member 90 located along the local axis of rotation 40 exerts the rotational force upon the hinge inlet 30 to rotate the hinge inlet 30 into the second step opened position.

As seen in FIG. 6, the hinge inlet 30 includes one or more hinge knuckles 110 that include a passageway (not visible) that receives a pin 120. The pin 120 is disposed along the local axis of rotation 40. The hinge neck 32 also includes one or more hinge knuckles 112 that also include a passageway (not visible) that receives the pin 120 disposed along the local axis of rotation 40. Although FIG. 6 illustrates the hinge inlet 30 and the hinge neck 32 both including two hinge knuckles 110, 112, it is to be appreciated that the figures are merely exemplary in nature and the hinge inlet 30 and the hinge neck 32 may include one hinge knuckle, or more than two hinge knuckles. In the embodiment as illustrated in FIG. 6, the torsion biasing member 90 is a coil spring that is wrapped around or surrounds the pin 120. The torsion biasing member 90 includes a first arm 122 that is received by a recess 124 located along the inlet abutment surface 50 of the hinge inlet 30 and a second arm 126 that is received by a recess 128 located along the neck abutment surface 84 of the hinge neck 32.

Figure 7:
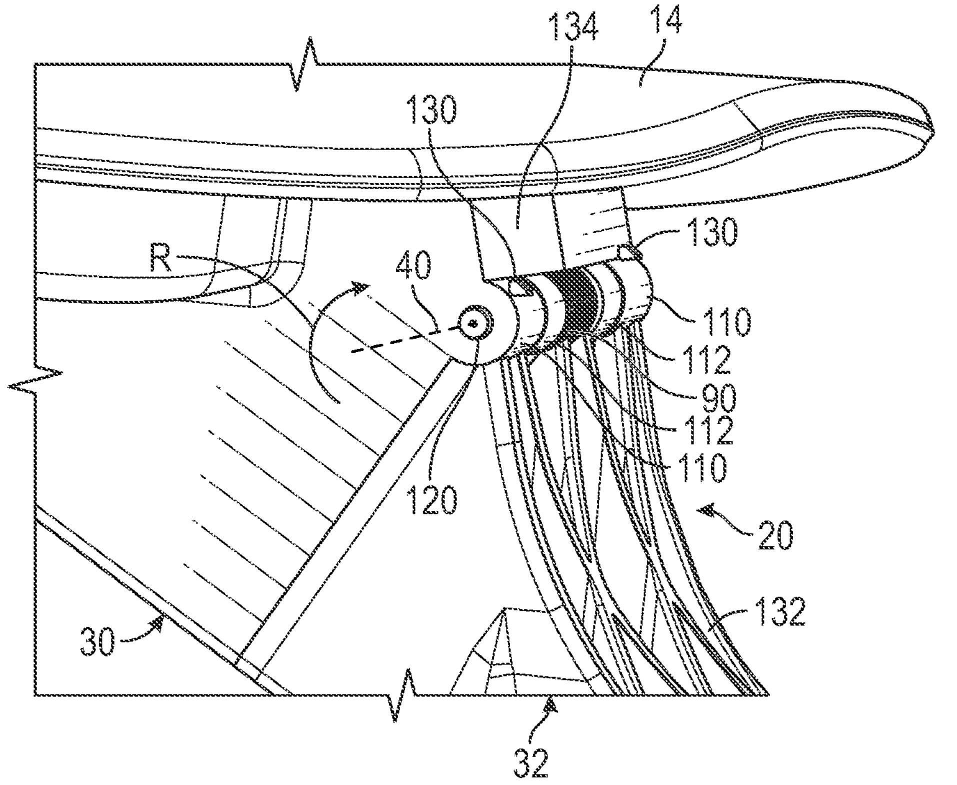
FIG. 7 is an enlarged, top view of the two-step hinge assembly that illustrates two stopper members disposed on the hinge inlet, according to an exemplary embodiment.
Figure 8:
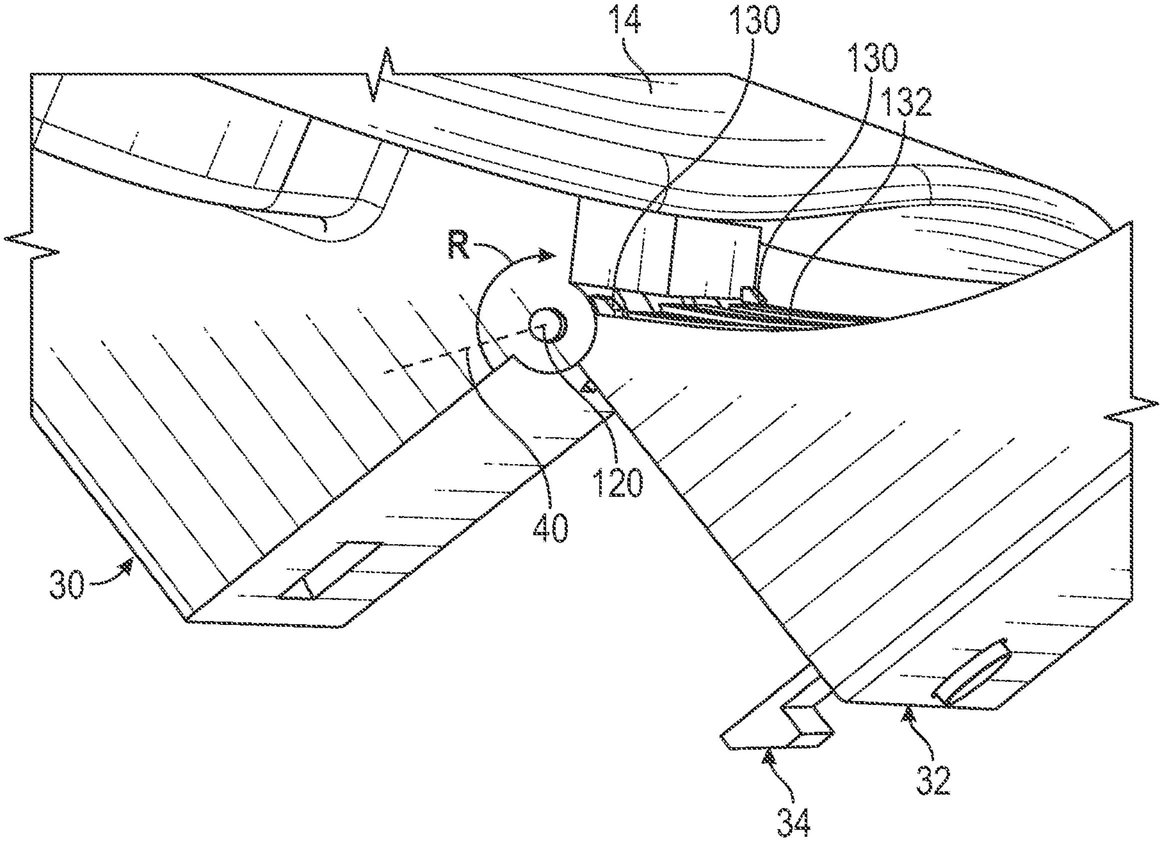
FIG. 8 illustrates the two stopper members of the hinge inlet abutting against an outer surface of the hinge neck when the two-step hinge assembly is in the second step opened position, according to an exemplary embodiment.

FIG. 7 is an enlarged top view of the two-step hinge assembly 20 illustrating one or more stopper members 130 that are part of the hinge inlet 30. FIG. 7 illustrates the two-step hinge assembly 20 in the first step opened position and FIG. 8 illustrates the two-step hinge assembly 20 shown in FIG. 7 rotated into the second step opened position. Referring to both FIGS. 7 and 8, the one or more stopper members 130 are each positioned to simultaneously abut against an outer surface 132 of the hinge neck 32 as the two-step hinge assembly 20 rotates in the direction R from the first step opened position into the second step opened position. That is, the one or more stopper members 130 are each positioned to abut against the outer surface 132 of the hinge neck 32 to limit rotation of the hinge inlet 30 about the local axis of rotation 40 in the direction R when the two-step hinge assembly 20 is in the second step opened position. The stopper members 130 are raised protuberances that project outwardly from the hinge inlet 30.

In the non-limiting embodiment as shown in FIGS. 7 and 8, the hinge inlet 30 includes two stopper members 130. One of the stopper members 130 is positioned on a corresponding hinge knuckle 110 of the hinge inlet 30 and the remaining stopper member 130 is positioned along an outer surface 134 of the hinge inlet 30 and is adjacent to the remaining hinge knuckle 110 of the hinge inlet 30. Although the two stopper members 130 are not aligned with one another, both stopper members 130 are positioned so as to simultaneously abut against the outer surface 132 of the hinge neck 32 when the two-step hinge assembly 20 rotates in the direction R into the second step opened position. The abutment between the stopper members 130 and the outer surface 132 of the hinge neck 32 limit the amount of rotational travel of the hinge inlet 30 about the local axis of rotation 40 in the direction R, which in turn prevents the door cover 14 from inadvertently contacting the body panel 18 (FIG. 1) of the electric vehicle 12 when the two-step hinge assembly 20 is rotated into the second step opened position.

Referring generally to the figures, the disclosed two-step hinge assembly provides various technical effects and benefits. Specifically, the two-step hinge assembly provides an approach to increase the angle measured between the inner surface of the door cover and the body panel of an electric vehicle as the two-step hinge assembly rotates from the first step opened position to the second step opened position, which allows for the door cover to be positioned parallel with respect to the body panel. Positioning the door cover parallel with the body panel of the electric vehicle results in less space required between the electric vehicle and an adjacent vehicle. Requiring less space may be especially helpful when an individual opens the door cover to access the charge port when there is only limited clearance between the electric vehicle and another another vehicle parked directly adjacent to the electric vehicle during charging.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A two-step hinge assembly for a door cover that provides access to an opening defined by a body panel, the two-step hinge assembly comprising:

a hinge inlet attached to the door cover, the hinge inlet defining a mating feature, wherein the hinge inlet independently rotates about a local axis of rotation of the two-step hinge assembly between a first step opened position and a second step opened position;

a hinge neck rotatably mounted to the body panel about a main axis of rotation, wherein the hinge inlet and the hinge neck rotate together about the main axis of rotation when the two-step hinge assembly is in the first step opened position and a closed position;

a retaining member actuated between an engaged position and a disengaged position, wherein the retaining member engages with the mating feature of the hinge inlet when in the engaged position to secure the hinge inlet with the hinge neck, and wherein the two-step hinge assembly is in the closed position and the first step opened position when the retaining member is in the engaged position; and a biasing member exerting a biasing force upon the retaining member to maintain the retaining member in the engaged position, wherein the retaining member is urged from the engaged position into the disengaged position when an actuation force that opposes the biasing force is exerted upon the retaining member, and wherein the retaining member disengages with the mating feature of the hinge inlet when urged into the disengaged position to allow the hinge inlet to rotate independently about the local axis of rotation, and wherein the hinge neck defines a cavity shaped to receive a portion of the retaining member and the biasing member and the cavity includes a button opening disposed along an outer neck surface of the hinge neck, and wherein the outer neck surface of the hinge inlet is visible when the two-step hinge assembly is in the first step opened position.

2. The two-step hinge assembly of claim 1, wherein an angle measured between an inner surface of the door cover and the body panel increases as the hinge inlet rotates about the local axis of rotation from the first step opened position into the second step opened position.

3. The two-step hinge assembly of claim 1, wherein the hinge inlet includes an inlet opening that receives an engagement arm of the retaining member when the two-step hinge assembly is in the closed position and the first step opened position and the retaining member is in the engaged position.

4. The two-step hinge assembly of claim 3, wherein the inlet opening of the hinge inlet defines an inner surface and the mating feature, and wherein the mating feature is disposed along the inner surface of the inlet opening.

5. The two-step hinge assembly of claim 4, wherein the engagement arm of the retaining member includes a proximate end and a distal end, and wherein the distal end of the engagement arm includes a hook that defines a connection surface corresponding to the mating feature of the hinge inlet.

6. The two-step hinge assembly of claim 5, wherein the connection surface of the hook of the engagement arm of the retaining member abuts against a mating surface defined by the mating feature disposed along the inner surface of the inlet opening of the hinge inlet.

7. The two-step hinge assembly of claim 1, wherein the retaining member includes a button, and wherein the button opening of the of the hinge neck receives the button of the retaining member.

8. The two-step hinge assembly of claim 1, wherein the cavity defines a passageway that terminates at a first stopper surface.

9. The two-step hinge assembly of claim 8, wherein the retaining member includes a biasing arm that defines a first contact surface, and wherein the retaining member continues to move within the cavity in the same direction as the actuation force until the first contact surface of the biasing arm of the retaining member abuts against the first stopper surface of the passageway of the cavity.

10. The two-step hinge assembly of claim 1, comprising a torsion biasing member located along the local axis of rotation, wherein the torsion biasing member exerts a rotational force upon the hinge inlet to rotate the hinge inlet from the first step opened position into the second step opened position.

11. The two-step hinge assembly of claim 1, wherein the hinge inlet includes one or more hinge knuckles that receive a pin disposed along the local axis of rotation.

12. The two-step hinge assembly of claim 1, wherein the hinge inlet includes one or more stopper members that are each positioned to simultaneously abut against an outer surface of the hinge neck as the two-step hinge assembly rotates from the first step opened position into the second step opened position.

13. The two-step hinge assembly of claim 1, wherein the biasing member is one of the following: a coil spring, a ring constructed of an elastically deformable material, and a pad constructed of an elastically deformable material.

14. The two-step hinge assembly of claim 1, wherein the door cover is positioned perpendicular with respect to the body panel when the two-step hinge assembly is in the first step opened position and is positioned parallel with respect to the body panel when the two-step hinge assembly is in the second step opened position.

15. A door assembly, comprising:

a body panel defining an opening;

a door cover that provides access to the opening defined by the body panel; and a two-step hinge assembly that rotatably mounts the door cover to the body panel, wherein the two-step hinge assembly comprises:

a hinge inlet attached to the door cover, the hinge inlet defining a mating feature, wherein the hinge inlet independently rotates about a local axis of rotation of the two-step hinge assembly between a first step opened position and a second step opened position;

a hinge neck rotatably mounted to the body panel about a main axis of rotation, wherein the hinge inlet and the hinge neck rotate together about the main axis of rotation when the two-step hinge assembly is in the first step opened position and a closed position, and wherein the hinge inlet includes one or more stopper members that are each positioned to simultaneously abut against an outer surface of the hinge neck as the two-step hinge assembly rotates from the first step opened position into the second step opened position;

a retaining member actuated between an engaged position and a disengaged position, wherein the retaining member engages with the mating feature of the hinge inlet when in the engaged position to secure the hinge inlet with the hinge neck, and wherein the two-step hinge assembly is in the closed position and the first step opened position when the retaining member is in the engaged position; and a biasing member exerting a biasing force upon the retaining member to maintain the retaining member in the engaged position, wherein the retaining member is urged from the engaged position into the disengaged position when an actuation force that opposes the biasing force is exerted upon the retaining member, and wherein the retaining member disengages with the mating feature of the hinge inlet when urged into the disengaged position to allow the hinge inlet to rotate independently about the local axis of rotation.

16. The door assembly of claim 15, wherein an angle measured between an inner surface of the door cover and the body panel increases as the hinge inlet rotates about the local axis of rotation from the first step opened position into the second step opened position.

17. The door assembly of claim 15, wherein the hinge inlet includes an inlet opening that receives an engagement arm of the retaining member when the two-step hinge assembly is in the closed position and the first step opened position and the retaining member is in the engaged position.

18. A door assembly for a vehicle, comprising:

a body panel defining an opening;

a door cover that provides access to the opening defined by the body panel; and a two-step hinge assembly that rotatably mounts the door cover to the body panel, wherein the two-step hinge assembly comprises:

a hinge inlet attached to the door cover, the hinge inlet defining a mating feature and an inlet opening, wherein the hinge inlet independently rotates about a local axis of rotation of the two-step hinge assembly between a first step opened position and a second step opened position;

a hinge neck rotatably mounted to the body panel about a main axis of rotation, wherein the hinge inlet and the hinge neck rotate together about the main axis of rotation when the two-step hinge assembly is in the first step opened position and a closed position;

a retaining member actuated between an engaged position and a disengaged position and including an engagement arm, wherein the engagement arm of the retaining member is received by the inlet opening of the hinge inlet and engages with the mating feature of the hinge inlet when in the engaged position to secure the hinge inlet with the hinge neck, and wherein the two-step hinge assembly is in the closed position and the first step opened position when the retaining member is in the engaged position; and a biasing member exerting a biasing force upon the retaining member to maintain the retaining member in the engaged position, wherein the retaining member is urged from the engaged position into the disengaged position when an actuation force that opposes the biasing force is exerted upon the retaining member, and wherein the retaining member disengages with the mating feature of the hinge inlet when urged into the disengaged position to allow the hinge inlet to rotate independently about the local axis of rotation, and wherein an angle measured between an inner surface of the door cover and the body panel increases as the hinge inlet rotates about the local axis of rotation from the first step opened position into the second step opened position.

19. The door assembly of claim 17, wherein the inlet opening of the hinge inlet defines an inner surface and the mating feature, and wherein the mating feature is disposed along the inner surface of the inlet opening.

20. The door assembly of claim 19, wherein the engagement arm of the retaining member includes a proximate end and a distal end, and wherein the distal end of the engagement arm includes a hook that defines a connection surface corresponding to the mating feature of the hinge inlet.

* * * * *